(12) United States Patent
Kim et al.

(10) Patent No.: US 8,853,351 B2
(45) Date of Patent: Oct. 7, 2014

(54) HIGHLY PURE AMPHIPHILIC COPOLYMER COMPRISING HYDROPHOBIC BLOCK FROM ALPHA-HYDROXY ACID AND PROCESS FOR THE PREPARATION THEREOF

(75) Inventors: Bong Oh Kim, Daejeon (KR); Myung Seob Shim, Seoul (KR); Min-Hyo Seo, Daejeon (KR)

(73) Assignee: Samyang Biopharmaceuticals Corporation, Seoul (KR)

( * ) Notice: Subject to any disclaimer, the term of this patent is extended or adjusted under 35 U.S.C. 154(b) by 490 days.

(21) Appl. No.: 12/810,280

(22) PCT Filed: Dec. 31, 2008

(86) PCT No.: PCT/KR2008/007854
§ 371 (c)(1),
(2), (4) Date: Jun. 23, 2010

(87) PCT Pub. No.: WO2009/091150
PCT Pub. Date: Jul. 23, 2009

(65) Prior Publication Data
US 2010/0280214 A1   Nov. 4, 2010

(30) Foreign Application Priority Data
Dec. 31, 2007 (KR) .................. 10-2007-0141165

(51) Int. Cl.
*C08C 1/14* (2006.01)
*C08G 63/664* (2006.01)
*C08G 63/90* (2006.01)

(52) U.S. Cl.
CPC .............. *C08G 63/90* (2013.01); *C08G 63/664* (2013.01); *C08G 2261/126* (2013.01)
USPC .......................................... 528/488; 528/490

(58) Field of Classification Search
CPC ............... C08C 1/14; C08F 6/12; C08F 6/14; C08G 63/90
USPC ................................................. 528/488, 490
See application file for complete search history.

(56) References Cited

U.S. PATENT DOCUMENTS

| | | | |
|---|---|---|---|
| 6,143,863 A | 11/2000 | Gruber et al. | |
| 6,353,030 B1 | 3/2002 | Prikoszovich | |
| 2004/0151690 A1 | 8/2004 | Nakanishi et al. | |
| 2005/0238618 A1 | 10/2005 | Huang | |

FOREIGN PATENT DOCUMENTS

| | | |
|---|---|---|
| CN | 1370201 | 9/2002 |
| JP | 06-041007 A | 2/1994 |
| JP | 2005-505674 A | 2/2005 |
| JP | 2007-204509 | 8/2007 |
| KR | 10-2002-0045569 | 6/2002 |
| KR | 10-2006-0013377 | 2/2006 |
| WO | WO 03/028589 A1 | 4/2003 |

OTHER PUBLICATIONS

Dong et al. Methoxy poly(ethylene glycol)—poly(lactide) ( MPEG-PLA) nanoparticles for controlled delivery of anticancer drugs, Biomaterials 25,2004,2843-2849.*

K.Avgoustakis "Pegylated Poly(Lactide) and Poly(Lactide-Co-Glycofide)Nanoparticles: Preparation, Properties and Possible Applications in Drug Delivery", Current Drug Delivery, 2004, I , pp. 321-333.*

C. Matkovich "Salting out of Acetone from Water—basis of a new solvent extraction system", analytical Chemistry, V.45,No. 11, Sep. 1973.*

Dong et al., "Methoxy poly(ethylene glycol)-poly(lactide) (MPEG-PLA) nanoparticles for controlled delivery of anticancer drugs,", Biomaterials, 2004, pp. 2843-2849.

Office Action for corresponding Chinese application No. 200880123623.0 (and English translation) mailed Aug. 29, 2011.

Lo et al., "Mixed micelles formed from graft and diblock copolymers for application in intracellular drug delivery," *Biomaterials* (2007) 28: 1225-1235. XP005788957.

Extended European Search Report for corresponding EP application No. EP 08 87 0556, May 19, 2011.

Dong et al., "Methoxy poly(ethylene glycol)-poly(lactide) (MPEG-PLA) nanoparticles for controlled delivery of anticancer drugs," Biomaterials, 2004, pp. 2843-2849.

* cited by examiner

*Primary Examiner* — Ling Choi
*Assistant Examiner* — Gennadiy Mesh
(74) *Attorney, Agent, or Firm* — Merchant & Gould P.C.

(57) ABSTRACT

Disclosed are a highly pure amphiphilic block copolymer including a hydrophobic polymer block of a poly(α-hydroxy acid), and a method for preparing the same. The method for preparing a highly pure amphiphilic block copolymer including a hydrophobic polymer block of a poly(α-hydroxy acid) includes removing α-hydroxy acid, lactone monomers thereof, oligomers thereof and an organometal catalyst in polymerizing the amphiphilic block copolymer.

8 Claims, 2 Drawing Sheets

HIGHLY PURE AMPHIPHILIC COPOLYMER COMPRISING HYDROPHOBIC BLOCK FROM ALPHA-HYDROXY ACID AND PROCESS FOR THE PREPARATION THEREOF

This application is a National Stage Application of PCT/KR2008/007854, filed Dec. 31, 2008, which claims benefit of Ser. No. 10-2007-0141165, filed Dec. 31, 2007 in The Republic of Korea and which applications are incorporated herein by reference. To the extent appropriate, a claim of priority is made to each of the above disclosed applications.

TECHNICAL FIELD

The present invention relates to a highly pure amphiphilic block copolymer including a hydrophobic polymer block of a poly($\alpha$-hydroxy acid), and a method for preparing the same.

BACKGROUND ART

An amphiphilic block copolymer includes a hydrophilic polymer block and a hydrophobic polymer block. Since the hydrophilic polymer block is in direct contact with blood proteins and cell membranes in vivo, a biocompatible polymer such as polyethylene glycol or monomethoxypolyethylene glycol has been used as the hydrophilic polymer block. Meanwhile, the hydrophobic polymer block improves affinity to hydrophobic drugs, and particular examples thereof that have been used to date include biodegradable polymers such as polylactide, polyglycolide, poly(lactic-co-glycolide), polycaprolactone, polyaminoacids or polyorthoesters. Particularly, polylactide derivatives have been applied to drug carriers in various forms, because they have excellent biocompatibility and are hydrolyzed into non-harmful lactic acid in vivo. Polylactide derivatives have various physical properties depending on their molecular weights. In addition, polylactide derivatives have been developed as various forms including microspheres, nanoparticles, polymeric gels and implant agents.

When an amphiphilic block copolymer is used as a drug carrier, drug release rates are controlled by modifying the composition of the hydrophilic polymer block and the hydrophobic polymer block, the molecular weight of each block, etc. In controlling drug release rates precisely, purity of the amphiphilic block copolymer is important. Monomers are used to prepare the hydrophobic biodegradable polymer block. However, unreacted monomers contained in the final amphiphilic block copolymer may result in a broad molecular weight distribution. When a low molecular weight polymer is administered to the human body, excessive drug release may occur at the early stage. In addition, any residual monomer may be decomposed to reduce pH so that the polymer is decomposed rapidly, which leads to a failure in continued drug release.

Under these circumstances, there has been suggested a method for purifying an amphiphilic block copolymer containing a polylactide derivative as a hydrophobic block by a solvent/non-solvent process. In the method, a methylene chloride/ether system is used as the solvent/non-solvent system to remove monomers, d,l-lactide. Although the method is effective for removing d,l-lactide, stannous octoate used as a catalyst for the polymerization co-precipitates with the block copolymer in the non-solvent, and thus is hardly removed from the block copolymer. Additionally, due to very low boiling points of ethers used as the non-solvent, the method is not suitable for commercialization. The catalyst, stannous octoate, still remaining after the solvent/non-solvent purification, may accelerate hydrolysis of polylactide derivatives, resulting in a decrease in the molecular weight of the block copolymer, and thus a decrease in pH.

As another approach, there has been suggested a method for removing monomers without using any solvent. In the method, after an amphiphilic copolymer containing a polylactide derivative is prepared, unreacted lactide monomers are removed under a high-temperature vacuum condition via sublimation based on the sublimation property of lactide. The method is favorable to commercialization. However, the method has difficulty in reducing the content of residual monomers to 1 wt % or less. In addition, such long-period high-temperature vacuum conditions interrupt control of a desired molecular weight due to the pyrolysis of the resultant polymer. Further, an organometal catalyst used for the polymerization still remains after carrying out the method.

Meanwhile, US Patent Publication No. 2005/0238618 discloses a method for purifying low molecular weight d,l-polylactic acid via liquid/liquid phase separation. A phase separation phenomenon occurs when the polymer obtained after polymerization is heated and dissolved in methanol or ethanol, and then refrigerated and stored at −78° C. Low-molecular weight polylactic acid is dissolved in the upper organic solvent layer, while high-molecular weight polylactic acid is solidified in the lower layer. The lower layer is separated and the solvent of the lower layer is removed via distillation to remove monomers and oligomers. It is described that the method provides highly pure d,l-polylactic acid having a narrow molecular weight distribution. However, since the low-temperature refrigeration causes a drop in the solubility of unreacted lactide monomers and precipitation of the unreacted monomers, it is difficult to remove the unreacted monomers. Moreover, amphiphilic block copolymers are not liquid/liquid phase separable even under low-temperature refrigeration. Therefore, the method is not suitable for the purification of amphiphilic block copolymers.

DISCLOSURE

Technical Problem

Disclosed is a method for preparing a highly pure amphiphilic block copolymer including a hydrophobic polymer block of a poly($\alpha$-hydroxy acid), which includes effectively removing monomers, low molecular weight polymers and an organometal catalyst from an amphiphilic block copolymer including a hydrophobic polymer block of a poly ($\alpha$-hydroxy acid).

Also disclosed is a highly pure amphiphilic block copolymer including a hydrophobic polymer block of a poly($\alpha$-hydroxy acid).

Further disclosed is a pharmaceutical composition of microspheres, polymer micelles, etc. using the highly pure amphiphilic block copolymer including a hydrophobic polymer block of a poly($\alpha$-hydroxy acid).

Technical Solution

In one aspect, there is provided a method for preparing a highly pure amphiphilic block copolymer including a hydrophobic polymer block of a poly($\alpha$-hydroxy acid), the method including: dissolving an amphiphilic block copolymer including a hydrophobic polymer block of a poly($\alpha$-hydroxy acid) into a water-miscible organic solvent; adding water or an aqueous solution containing an alkali metal salt to a resultant polymer solution, followed by mixing; separating a resultant solution into an organic solvent layer and an aqueous layer via salting out; and collecting the organic solvent layer and removing the organic solvent therefrom to recover a polymer.

In another aspect, there is provided a highly pure amphiphilic block copolymer including a hydrophobic polymer block of a poly(α-hydroxy acid), the amphiphilic block copolymer having a content of lactone monomers of an α-hydroxy acid of 1.0 wt % or less based on the total weight of the copolymer, and a content of metal of an organometal catalyst of 50 ppm or less based on the total weight of the copolymer.

Advantageous Effects

According to the amphiphilic block copolymer and the method for preparing the same as disclosed herein, it is possible to obtain a highly pure polymer by effectively removing the unreacted monomers and the organometal catalyst contained in the amphiphilic block copolymer. It is also possible to reduce toxicity and side reactions caused by byproducts significantly. Further, the method for purifying the amphiphilic block copolymer is applied with ease to commercial processes for preparing medical polymers, thereby increasing the medical and industrial applicability of the amphiphilic block copolymer.

DESCRIPTION OF DRAWINGS

The above and other aspects, features and advantages of the disclosed exemplary embodiments will be more apparent from the following detailed description taken in conjunction with the accompanying drawings in which.

MODE FOR INVENTION

Figure 1:
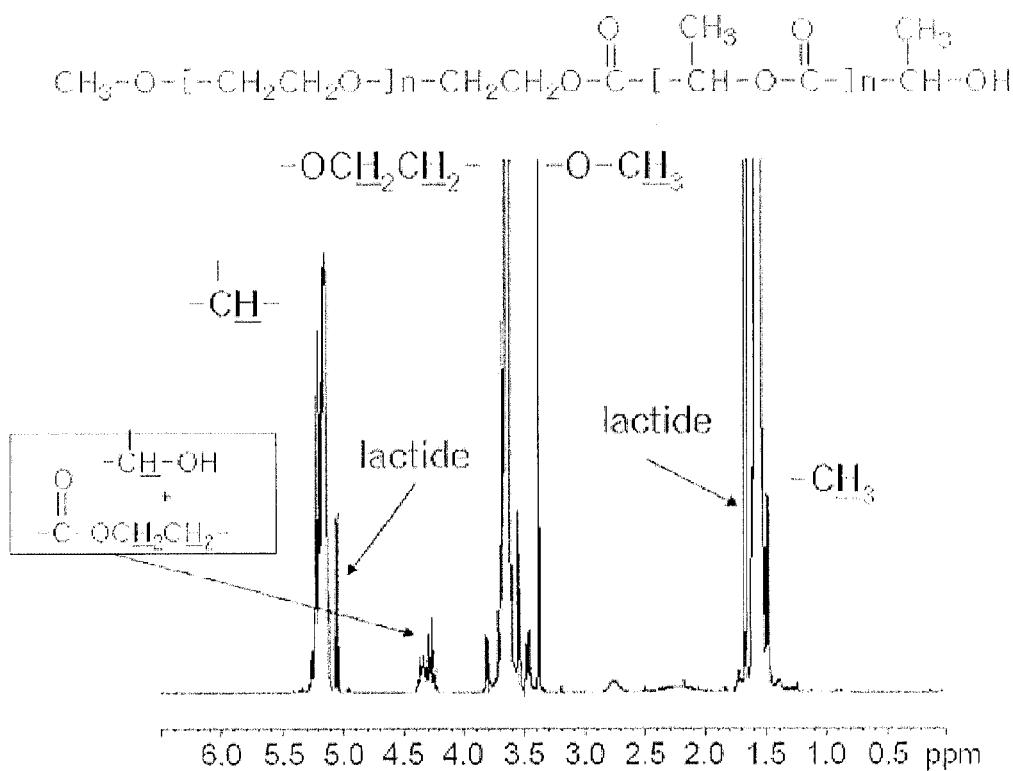
FIG. 1 shows the $^1$H-NMR spectrum of the diblock copolymer mPEG-PLA obtained from Preparation Example 1.

Exemplary embodiments are described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In one aspect, there is provided a highly pure amphiphilic block copolymer including a hydrophobic polymer block of a poly(α-hydroxy acid). In another aspect, there is provided a method for preparing the above amphiphilic block copolymer.

In one embodiment, the method for preparing a highly pure amphiphilic block copolymer including a hydrophobic polymer block of a poly(α-hydroxy acid) includes:

dissolving an amphiphilic block copolymer including a hydrophobic polymer block of a poly(α-hydroxy acid) into a water-miscible organic solvent;

mixing a resultant polymer solution with water or an aqueous solution containing an alkali metal salt;

separating a resultant solution into an organic solvent layer and an aqueous layer via salting out and collecting the organic solvent layer and removing the organic solvent therefrom to recover a polymer.

In another embodiment, the highly pure amphiphilic block copolymer including a hydrophobic polymer block of a poly(α-hydroxy acid) has a content of lactone monomers of an α-hydroxy acid of 1.0 wt % or less based on the total weight of the copolymer, and a content of metal of an organometal catalyst of 50 ppm or less based on the total weight of the copolymer. More particularly, the highly pure amphiphilic block copolymer including a hydrophobic polymer block of a poly(α-hydroxy acid) has a content of lactone monomers of an α-hydroxy acid of 0.5 wt % or less based on the total weight of the copolymer, and a content of metal of an organometal catalyst of 20 ppm or less based on the total weight of the copolymer. According to one embodiment, there is provided a highly pure amphiphilic block copolymer including a polymer block of polylactide, the copolymer having a lactide content of 1.0 wt % or less based on the total weight of the copolymer, and a content of metal of an organometal catalyst of 50 ppm or less based on the total weight of the copolymer.

The highly pure amphiphilic block copolymer including a hydrophobic polymer block of a poly(α-hydroxy acid) and preparation thereof are described in more detail hereinafter.

According to one embodiment, there is provided a method for preparing a highly pure amphiphilic block copolymer including a hydrophobic polymer block of a poly(α-hydroxy acid). The method includes hydrolyzing monomers to increase the solubility of the monomers to an aqueous solution, and adopting a salting-out technique using a salt compound to perform liquid/liquid phase separation.

More particularly, the method according to one embodiment includes:

dissolving an amphiphilic block copolymer including a hydrophobic polymer block of a poly(α-hydroxy acid) into a water-miscible organic solvent;

mixing a resultant polymer solution with water or an aqueous solution containing an alkali metal salt;

separating a resultant solution into an organic solvent layer and an aqueous layer via salting out; and collecting the organic solvent layer and removing the organic solvent therefrom to recover a polymer.

The amphiphilic block copolymer obtained from the method according to one embodiment includes an A-B type diblock copolymer or a B-A-B type triblock copolymer consisting of a hydrophilic block (A) and a hydrophobic block (B). The amphiphilic block copolymer has a hydrophilic block content of 20 wt %-95 wt %, more particularly 40 wt %-95 wt %, and a hydrophobic block content of 5 wt %-80 wt %, more particularly 5 wt %-60 wt %. The amphiphilic block copolymer may have a number average molecular weight of 1,000 Daltons to 50,000 Daltons, more particularly 1,500 Daltons to 20,000 Daltons.

The hydrophilic polymer block includes a biocompatible polymer such as polyethylene glycol or a derivative thereof, polyvinylpyrrolidone, polyvinyl alcohol or polyacrylamide. More particularly, the hydrophilic polymer block includes polyethylene glycol or monomethoxypolyethylene glycol. The hydrophilic block may have a number average molecular weight of 200 Daltons to 20,000 Daltons, specifically 200 Daltons to 10,000 Daltons.

The hydrophobic polymer block includes a biodegradable polymer such as a polymer of monomers derived from α-hydroxy acid. The hydrophobic polymer block may include at least one polymer selected from the group consisting of polylactide, polyglycolide, poly(mandelic acid), polycaprolactone or poly(dioxan-2-one), copolymers thereof, polyaminoacids, polyorthoesters, polyanhydrides and polycarbonates. More particularly, the hydrophobic polymer block includes polylactide, polyglycolide, polycaprolactone or poly(dioxan-2-one).

The amphiphilic block copolymer including a hydrophobic polymer block of a poly(α-hydroxy acid) may be represented by the following Formula 1:

[Formula 1]

$$HO-[R^1]_l-[R^2]_m-[R^3]_n-R^4 \quad \text{[Formula 1]}$$

wherein
$R^1$ is $-CHZ-C(=O)-O-$;
$R^2$ is $-CHY-C(=O)-O-$, $-CH_2CH_2CH_2CH_2CH_2-C(=O)-O-$ or $-CH_2CH_2OCH_2-C(=O)-O-$;
$R^3$ is $-CH_2CH_2O-$, $-CH(OH)-CH_2-$, $-CH(C(=O)-NH_2)-CH-$ or

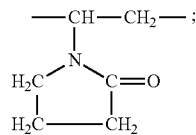

$R^4$ is $-CH_3$ or $-C(=O)-[R^1]_l-[R^2]_m-CHZ-OH$;
each of Z and Y is $-H$, $-CH_3$, $-C_6H_5$ or $C_6H_5-CH_2-$;
each of l and m is an integer of 0-300, with the proviso that both l and m are not 0 at the same time; and
n is an integer of 4-1,100.

First, in the method according to one example embodiment, an amphiphilic block copolymer including a hydrophobic polymer block of a poly(α-hydroxy acid) is dissolved into a water-miscible organic solvent. The water-miscible solvent is a solvent capable of solubilizing the amphiphilic block copolymer and has a boiling point of 100° C. or lower. Particular examples of the water-miscible solvent include acetone or acetonitrile. The organic solvent may be used in an amount corresponding to 0.5-5 times, more particularly 0.5-2 times of the weight of the amphiphilic block copolymer.

Next, water or an aqueous solution containing an alkali metal salt is gradually added to and mixed with the organic solvent containing the polymer dissolved therein. By doing so, low molecular weight polylactide derivatives and lactone monomers are hydrolyzed, and then are subjected to neutralization with the alkali metal salt, thereby forming a salt compound. On the contrary, since the poly(α-hydroxy acid) contained in the amphiphilic block copolymer has a terminal hydroxyl group, it does not react with the alkali metal salt. Particular examples of the aqueous solution containing an alkali metal salt that may be used include aqueous solutions of sodium bicarbonate, sodium carbonate, potassium bicarbonate, potassium carbonate or lithium carbonate. More particularly, the aqueous solution containing an alkali metal salt may be an aqueous sodium bicarbonate solution. The aqueous solution may have a concentration of 0.05 g/mL to 0.2 g/mL, more particularly about 0.1 g/mL. Addition amount of water or an aqueous solution containing an alkali metal salt may depend on the content of unreacted monomers and the amount of the organic solvent. Particularly, water or the aqueous alkali metal solution may be added in an amount corresponding to 0.5-5 times, specifically 0.5-2 times of the volume of the organic solvent. Herein, a resultant mixed solution may be heated at 25-100° C. for 10 minutes to 24 hours, more particularly, at 60-80° C. for 2 to 6 hours to carry out a reaction. If the mixed solution is heated to a higher temperature than the above range, the resultant amphiphilic block copolymer may be hydrolyzed at the site of its hydrophobic block, resulting in a decrease in the molecular weight of the copolymer.

Then, the mixed solution is separated into the water-miscible organic solvent layer and the aqueous layer by adding another salt compound thereto, because the salt compound formed by the preceding operation has a high solubility to an aqueous solution. Particular examples of the salt compound that may be used herein include sodium chloride or potassium chloride. The salt compound may be added in an amount of 0.1-50 wt %, more particularly 0.1-20 wt % based on the total weight of the amphiphilic block copolymer. Thus, the organic solvent layer includes a purified amphiphilic block copolymer dissolved therein, while the aqueous layer includes the salt compound, the alkali metal salt, metal salts of the neutralized monomers and the organometal catalyst.

Finally, the organic solvent layer separated as described above is collected, and the organic solvent is removed therefrom to recover the purified polymer. The organic solvent may be removed via a known fractional distillation process or a (solvent/non-solvent) precipitation process. More particularly, fractional distillation may be used to remove the organic solvent, for example, at a temperature of 60-80° C.

According to another example embodiment, to remove the salt compound and the alkali metal salt present in the finally formed polymer in a small amount, the method may further include:

dissolving the polymer recovered after removing the organic solvent into an anhydrous organic solvent, followed by filtering, to obtain a solution containing the polymer; and removing the organic solvent from the solution containing the polymer.

Particularly, addition of the anhydrous organic solvent to the polymer allows the amphiphilic block copolymer to be dissolved in the organic solvent and causes precipitation of the salt compound and the alkali metal salt present in the polymer in a small amount. Thus, the precipitated salt compound and the alkali metal salt may be removed by filtering. Any anhydrous organic solvent may be used with no particular limitation, as long as the anhydrous organic solvent is capable of dissolving the purified polymer. Particular examples of the anhydrous organic solvent include low-toxic solvents with a low boiling point, such as acetone and acetonitrile.

After removing the salt compound and the alkali metal salt as described above, the organic solvent is finally removed from the purified polymer-containing organic solution. Herein, the organic solvent may be removed via a known fractional distillation process or a (solvent/non-solvent) precipitation process. More particularly, fractional distillation may be used to remove the organic solvent, for example, at a temperature of 60-80° C.

The amphiphilic block copolymer according to one example embodiment includes an A-B type diblock copolymer or a B-A-B type triblock copolymer consisting of a hydrophilic block (A) and a hydrophobic block (B). The amphiphilic block copolymer has a hydrophilic block content of 20 wt %-95 wt %, more particularly 40 wt %-95 wt %, and a hydrophobic block content of 5 wt %-80 wt %, more particularly 5 wt %-60 wt %. The amphiphilic block copolymer may have a number average molecular weight of 1,000 Daltons to 50,000 Daltons, more particularly 1,500 Daltons to 20,000 Daltons.

The hydrophilic polymer block includes a biocompatible polymer such as polyethylene glycol or a derivative thereof, polyvinylpyrrolidone, polyvinyl alcohol or polyacrylamide. More particularly, the hydrophilic polymer block includes polyethylene glycol or monomethoxypolyethylene glycol. The hydrophilic block may have a number average molecular weight of 200 Daltons to 20,000 Daltons, specifically 200 Daltons to 10,000 Daltons.

The hydrophobic polymer block includes a biodegradable polymer such as a polymer of monomers derived from α-hydroxy acid. The hydrophobic polymer block may include at least one polymer selected from the group consisting of polylactide, polyglycolide, poly(mandelic acid), polycaprolactone or poly(dioxan-2-one), copolymers thereof, polyaminoacids, polyorthoesters, polyanhydrides and polycarbonates. More particularly, the hydrophobic polymer block includes polylactide, polyglycolide, polycaprolactone or poly(dioxan-2-one).

The amphiphilic block copolymer including a hydrophobic polymer block of a poly(α-hydroxy acid) may be synthesized via a known ring-opening polymerization process using a hydroxyl group-containing hydrophilic polymer as initiators and lactone monomers of α-hydroxy acid. For example, hydroxyl group-containing hydrophilic polyethylene glycol or monomethoxypolyethylene glycol may be used as an initiator to perform ring-opening polymerization of l-lactide or d,l-lactide. Diblock or triblock copolymers may be obtained depending on the number of hydroxyl groups present in the hydrophilic block as an initiator. Upon the ring-opening polymerization, an organometal catalyst such as stannous oxide, lead oxide, stannous octoate or antimony octoate may be used. When preparing a medical polymer, stannous octoate may be used as an organometal catalyst because it has biocompatibility.

However, the amphiphilic block copolymer obtained from the above polymerization process still includes unreacted lactone monomer compounds of an α-hydroxy acid such as lactide, decomposition products of the lactone monomers, low molecular weight α-hydroxy acid oligomers and the organometal catalyst.

The lactone monomers, decomposition products thereof and low molecular weight α-hydroxy acid oligomers are easily decomposed in vivo and in an aqueous solution, resulting in a drop of pH. This accelerates decomposition of the resultant polymer or adversely affects the stability of a drug contained in the polymer, thereby causing generation of impurities. Additionally, the organometal catalyst contained in the resultant polymer as an impurity accelerates hydrolysis of the hydrophobic block and causes a drop of molecular weight, resulting in a drop of pH. Such accelerated hydrolysis caused by the organometal catalyst impurity inhibits the hydrophobic block used as a drug carrier in a formulated composition from releasing the drug continuously, resulting in undesired rapid drug release and a failure in controlling the drug release rate. Therefore, when applying the amphiphilic block copolymer disclosed herein to drug carriers, it is required to control the amounts of the monomers, oligomers and organometal catalyst present in combination with the amphiphilic block copolymer in order to control the drug release rate and to prevent generation of impurities.

In this context, there is provided a highly pure amphiphilic block copolymer including a hydrophobic polymer block of a poly(α-hydroxy acid), the copolymer having a content of lactone monomers of an α-hydroxy acid of 1.0 wt % or less based on the total weight of the copolymer, and a content of metal of an organometal catalyst of 50 ppm or less based on the total weight of the copolymer. More particularly, the highly pure amphiphilic block copolymer including a hydrophobic polymer block of a poly(α-hydroxy acid) has a content of lactone monomers of an α-hydroxy acid of 0.5 wt % or less based on the total weight of the copolymer, and a content of metal of an organometal catalyst of 20 ppm or less based on the total weight of the copolymer. According to an example embodiment, there is provided a highly pure amphiphilic block copolymer including a polymer block of polylactide, the copolymer having a lactide content of 1.0 wt % or less based on the total weight of the copolymer, and a content of metal of an organometal catalyst of 50 ppm or less based on the total weight of the copolymer. A lactone monomer content greater than 1.0 wt % accelerates decomposition of the polymer and adversely affects the stability of a drug contained in the polymer, thereby causing generation of impurities. In addition, an organometal catalyst content greater than 50 ppm accelerates hydrolysis of the hydrophobic block and causes a drop of pH, which leads to a failure in continuous and controlled drug release.

According to one embodiment, the amphiphilic block copolymer including a hydrophobic polymer block of a poly(α-hydroxy acid) is represented by the above Formula 1.

Further, disclosed is a pharmaceutical composition of microspheres, polymer micelles, etc. containing the highly pure amphiphilic block copolymer including a hydrophobic polymer block of a poly(α-hydroxy acid).

The examples will now be described. The following examples are for illustrative purposes only and not intended to limit the scope of this disclosure.

PREPARATION EXAMPLE 1

Synthesis of mPEG-PLA Diblock Copolymer Including Monomethoxypolyethylene Glycol and d,l-Lactide First, 100 g of monomethoxypolyethylene glycol (mPEG: number average molecular weight 2,000) was introduced into a 250 mL round-bottom flask equipped with an agitator, and was dehydrated while being agitated at 120° C. for 2 hours under vacuum. Next, 0.1 g of stannous octoate (Sn(Oct)$_2$) dissolved in 200 µl of toluene was further added to the reaction flask, and toluene was removed via distillation while agitating the reaction mixture for 1 hour under vacuum.

Then, 100 g of d,l-lactide was added thereto and dissolved therein with stirring under nitrogen atmosphere. After the completion of the dissolution of d,l-lactide, the reactor was sealed to carry out a reaction at 120° C. for 20 hours. After the completion of the reaction, 193 g of a crude diblock copolymer mPEG-PLA (number average molecular weight: 3,725 Daltons) was obtained. Finally, the product was analyzed by H-NMR, and the molecular weight of the diblock copolymer was determined by calculating the intensity on the basis of —OCH$_3$, i.e., the terminal group of monomethoxypolyethylene glycol. FIG. 1 shows the $^1$H-NMR spectrum of the resultant amphiphilic copolymer. Lactide monomers were identified at 1.5 ppm and 5.0 ppm.

COMPARATIVE EXAMPLE 1

Purification of mPEG-PLA Diblock Copolymer Via Sublimation Process

First, 50 g of the mPEG-PLA obtained from Preparation Example 1 was introduced into a flask and dissolved at 120° C. While agitating the polymer with a magnetic bar, the reaction flask was connected to a vacuum pump to remove lactide at 1 torr or below via sublimation. After the sublimation, lactide was precipitated on the surface of the flask, and the precipitate was removed to obtain 46 g of a purified mPEG-PLA in a molten state. Then, the lactide content and Sn (catalyst) content were measured. The results are shown in the following Table 1.

COMPARATIVE EXAMPLE 2

Purification of mPEG-PLA Diblock Copolymer Via Solvent/Non-Solvent Purification Process First, 50 g of the mPEG-PLA obtained from Preparation Example 1 was dissolved in 100 mL of methylene chloride, and the solution was added gradually 1 L of diethyl ether under agitation to cause precipitation of the polymer in the form of particles. The polymer obtained after the precipitation was filtered, and then dried in a vacuum oven for 24 hours to obtain 43 g of a purified mPEG-PLA in the form of white solid particles. Then, the lactide content and Sn (catalyst) content were measured. The results are shown in the following Table 1.

EXAMPLE 1

Purification of mPEG-PLA Diblock Copolymer

Figure 2:
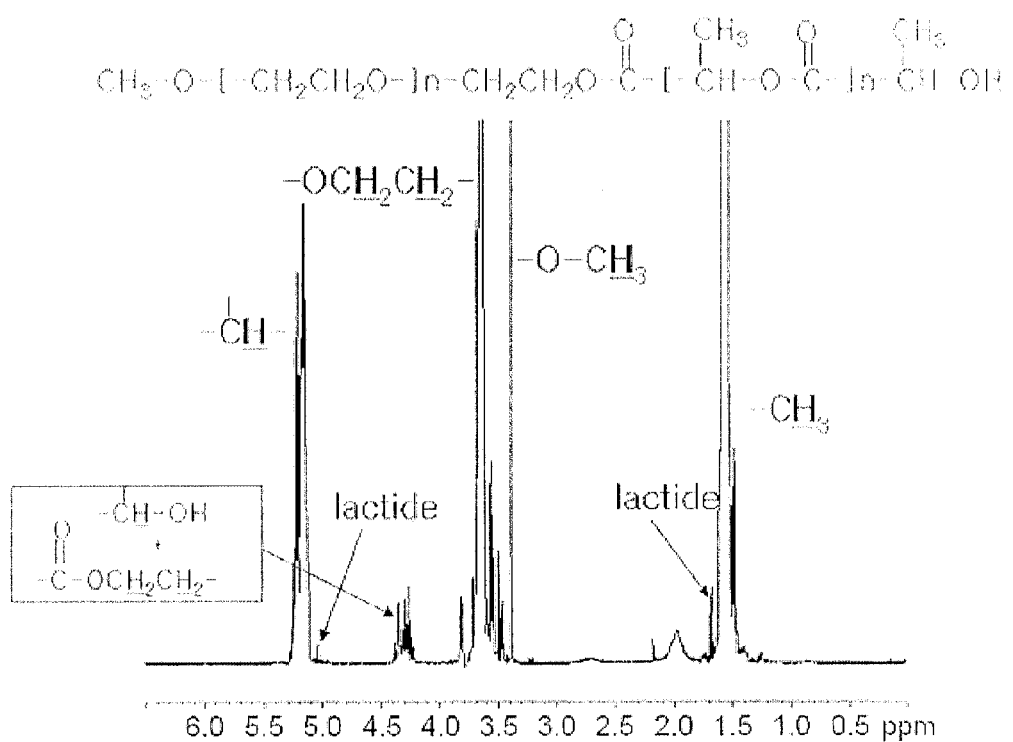
FIG. 2 shows the $^1$H-NMR spectrum of the diblock copolymer mPEG-PLA purified according to Example 1.

First, 50 g of the mPEG-PLA obtained from Preparation Example 1 was added to 100 mL of acetonitrile and dissolved therein. To the mPEG-PLA dissolved in acetonitrile, 100 mL of an aqueous sodium bicarbonate solution (0.1 g/mL) was added gradually, and the resultant mixture was agitated at 60° C. for 2 hours. Next, 10 g of sodium chloride was added thereto, and agitated and dissolved at room temperature, thereby causing phase separation between the two kinds of solvents at room temperature. The resultant two solvent layers were separated from each other by using a separatory funnel, and the organic solvent layer was collected. To the organic solvent layer, 100 mL of distilled water and 10 g of sodium chloride were added and dissolved with stirring. The resultant two solvent layers were separated again by using a separatory funnel and the organic solvent layer was collected. The organic solvent layer was subjected to fractional distillation at 80° C. for 2 hours under vacuum to remove acetonitrile and water completely. After that, 100 mL of anhydrous acetonitrile was added to cause precipitation of sodium chloride and sodium bicarbonate incorporated in the polymer during the dissolution thereof. The precipitate was separated off and acetonitrile was removed by carrying out fractional distillation at 80° C. for 2 hours under vacuum to obtain 45 g of a purified mPEG-PLA. Then, the lactide content and Sn (catalyst) content were measured. The results are shown in the following Table 1. In addition, $^1$H-NMR of the purified mPEG-PLA revealed that the peaks corresponding to lactide monomers were significantly reduced (see FIG. 2).

EXAMPLE 2

Purification of mPEG-PLA Diblock Copolymer

Example 1 was repeated except that 50 mL of an aqueous sodium bicarbonate solution (0.1 g/mL) was added gradually to mPEG-PLA to obtain 47 g of a purified mPEG-PLA. Then, the lactide content and Sn (catalyst) content were measured. The results are shown in the following Table 1.

EXAMPLE 3

Purification of mPEG-PLA Diblock Copolymer

Example 1 was repeated except that the hydrolysis of monomers was carried out under agitation at 40° C. for 2 hours to obtain 47 g of a purified mPEG-PLA. Then, the lactide content and Sn (catalyst) content were measured. The results are shown in the following Table 1.

TABLE 1

|  | Lactide Content [a] (wt %) | Sn Content [b] (ppm) |
|---|---|---|
| Preparation Example 1 | 2.75 | 128.8 |
| Comparative Example 1 | 1.85 | 127.1 |
| Comparative Example 2 | 0.41 | 117.4 |
| Example 1 | 0.38 | 4.0 |
| Example 2 | 0.42 | 0.62 |
| Example 3 | 0.4 | 0.57 |

[a] Lactide content was calculated by carrying out $^1$H-NMR analysis, and calculating the intensity on the basis of —OCH$_3$, i.e., the terminal group of monomethoxypolyethylene glycol.
[b] Sn content was determined by inductively coupled plasma (ICP) emission spectroscopy.

As can be seen from Table 1, the mPEG-PLA is prepared via ring-opening polymerization of d,l-lactide using stannous octoate as an organometal catalyst. The crude mPEG-PLA obtained from Preparation Example 1 contains a significant amount of lactide and organometal. In the mPEG-PLA purified via a sublimation process according to Comparative Example 1, lactide and the catalyst still remain with a very slight reduction in content. In addition, although the solvent/non-solvent purification process according to Comparative Example 2 is somewhat effective for removing lactide, it has substantially no effect on the removal of the organometal. Even though the catalyst used for the polymerization is an FDA approved chemical, any catalyst remaining in the final polymer may accelerate the hydrolysis of the polymer, thereby causing degradation of the physical properties of the polymer. On the contrary, according to the purification method disclosed herein, which includes hydrolysis of monomers and liquid/liquid phase separation, it is possible to reduce the residual monomer content as well as the organometal catalyst content significantly in the purified polymer.

While the exemplary embodiments have been shown and described, it will be understood by those skilled in the art that various changes in form and details may be made thereto without departing from the spirit and scope of this disclosure as defined by the appended claims.

In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

The invention claimed is:

1. A method for preparing an amphiphilic block copolymer comprising a hydrophobic polymer block of a poly(α-hydroxy acid), the method comprising the steps of:

dissolving an amphiphilic block copolymer comprising a hydrophobic polymer block of a poly(α-hydroxy acid) into a water-miscible organic solvent;

mixing a resultant polymer solution with water or an aqueous solution containing an alkali metal salt for 10 minutes to 24 hours to hydrolyze unreacted monomers contained in the amphiphilic block copolymer, wherein the alkali metal salt is sodium bicarbonate, sodium carbonate, potassium bicarbonate, potassium carbonate or lithium carbonate; adding sodium chloride or potassium chloride to the resultant solution in order to separate the solution into an organic solvent layer and an aqueous layer via salting out; and collecting the organic solvent layer and removing the organic solvent therefrom to recover a polymer, wherein the steps are performed sequentially.

2. The method according to claim 1, wherein the hydrophobic polymer block of a poly(α-hydroxy acid) is one or more of hydrophobic block selected from the group consisting of polylactide, polyglycolide, poly(mandelic acid), polycaprolactone or poly(dioxan-2-one), copolymers thereof, polyaminoacids, polyorthoesters, polyanhydrides and polycarbonates.

3. The method according to claim 1, wherein the amphiphilic block copolymer is represented by Formula 1:

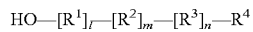   [Formula 1]

wherein
$R^1$ is —CHZ—C(=O)—O—;
$R^2$ is —CHY—C(=O)—O—, —CH$_2$CH$_2$CH$_2$CH$_2$CH$_2$—C(=O)—O— or —CH$_2$CH$_2$OCH$_2$—C(=O)—O—;
$R^3$ is —CH$_2$CH$_2$O—, —CH(OH)—CH$_2$—, —CH(C(=O)—NH$_2$)—CH$_2$— or

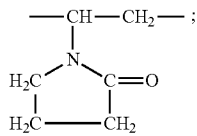

$R^4$ is —CH$_3$ or —C(=O)—[$R^1$]$_l$—[$R^2$]$_m$—CHZ—OH;
each of Z and Y is —H, —CH$_3$, —C$_6$H$_5$ or C$_6$H$_5$—CH$_2$—;
each of l and m is an integer of 0-300, with the proviso that both l and m are not 0 at the same time; and
n is an integer of 4-1,100.

4. The method according to claim 1, wherein the amphiphilic block copolymer has a number average molecular weight of 1,000 Daltons to 50,000 Daltons.

5. The method according to claim 1, wherein the amphiphilic block copolymer comprises 20 wt %-95 wt % of a hydrophilic polymer.

6. The method according to claim 1, wherein the aqueous alkali metal solution or water is added in an amount corresponding to 0.5 to 5 times of the volume of the organic solvent.

7. The method according to claim 1, wherein sodium chloride or potassium chloride is added in an amount of 0.1 wt %-50 wt % based on the total weight of the amphiphilic block copolymer.

8. The method according to claim 1, which further comprises, after recovering the polymer:

dissolving the polymer recovered after removing the organic solvent into an anhydrous organic solvent, followed by filtering, to obtain a solution containing the polymer; and removing the organic solvent from the solution containing the polymer.

* * * * *